Patented Feb. 27, 1934

1,949,028

UNITED STATES PATENT OFFICE 1,949,028

OXIDIZED LINSEED OIL AND PROCESS OF MAKING

Alexander Schwarcman, Buffalo, N. Y., assignor to Spencer Kellogg and Sons, Inc., Buffalo, N. Y., a corporation of New York No Drawing. Application March 16, 1932
Serial No. 599,367

4 Claims. (Cl. 87—12)

This invention relates to oxidized linseed oil and processes of making; and it comprises a linseed oil having the general properties of air blown oil, having a specific gravity of about 0.995, an iodin value of about 115 and being completely miscible with mineral oils, such as the usual "turpentine substitutes"; and it further comprises an improvement in making oxidized linseed oil, capable of producing the described oil, wherein linseed oil, freed of "break" is briefly heated to a temperature of about 600° F. is cooled to a temperature in the neighborhood of 300° F. and is then air blown, the time of exposure to the high temperature being insufficient to produce substantial bodying or decrease of iodin number; all as more fully hereinafter set forth and as claimed.

Many ways are known of treating linseed oil preparatory to paint and varnish making; the treatment varying according to the purpose for which the oil is to be used. Among these ways is the old and well known process of oxidizing linseed oil by air blowing. Air blowing may be done at any temperature between 300° and 170° F. The oxidized oil has many well known advantages in paint and varnish, but it has also some recognized disadvantages. Among these is a certain lack of miscibility with mineral oils; this being the more pronounced, the further oxidation goes. This is inconvenient for various reasons, among them being the common use of turpentine substitutes prepared from petroleum oils as thinners in paint and varnish compositions.

Taking linseed oil as having an original specific gravity of 0.93, oxidation may be carried so far as to give a specific gravity of 0.996, or very near 1.0. In a general way, it would be desirable to carry this increase in specific gravity this far at least, but difficulty is experienced with extensive air blowing, because of loss of miscibility in mineral oils. If air blowing is carried to an extreme, admixed mineral oils, such as turpentine substitutes, are apt to precipitate the oxidized oil in the finished paint, causing a segregation and spoiling the paint.

I have found that with a nearly momentary exposure of linseed oil to a temperature somewhere between 550° and 620° F., the oil, if afterwards air blown at the usual temperatures of 300° F. and below, does not lose miscibility with mineral oils, as is usual when it is air blown without this treatment. Oil, preliminarily briefly heated to 600° F. and then air blown, is miscible with mineral oils, even when brought to high specific gravity by air blowing.

In practical embodiments of my invention, it is not possible to heat large quantities of oil instantaneously to a high temperature and then cool as quickly; but I make heating, exposure to high temperature and cooling down to about 300° F. as brief as may be. In practice, I generally heat the oil in convenient quantities, such as 100 barrel lots, by a steam coil up to a temperature of about 300° F. Steam at 150 pounds pressure may be used. The oil is then allowed to flow through a small fire heated apparatus, where the temperature is stepped up from 300° F. to the desired 550-620° F., the flowing oil being thereafter cooled in suitable coils to temperatures between 170° and 300° F. During the exposure to the high temperature, oxidation should be precluded as far as possible; using either closed heating apparatus or apparatus of such a design as to allow evolved gases and vapors to shield the oil against access of air. Neither plus pressure nor vacuum is necessary. Prior to the heating, the oil should be freed of "break" and decolorized by a caustic soda treatment, or a short treatment by air blowing. The hot oil is cooled; and oil coming from the cooling coils at a temperature of about 300° F. is then air blown in any of the usual apparatus, for as long a time as may be necessary to produce sufficient body. For different purposes, different bodies are desirable; but I generally aim to attain a body of 0.995 or thereabouts. Even at this high specific gravity, blown oil made in the present way does not forfeit its miscibility with petroleum oil and it may be thinned indefinitely with turpentine substitutes. It has a considerable miscibility with pyroxylin compositions.

To illustrate the increased miscibility of my new product over the usual air blown linseed oil, I took a sample of pure linseed oil having a specific gravity of 0.930 and blew it at a temperature of about 170° F. until it acquired a specific gravity of 0.994. One part of this sample of blown oil was found to be miscible with up to 6 parts of turpentine substitute, but any quantity of substitute above 6 parts caused a precipitation of the linseed oil. But one part of a sample of the same linseed oil treated by my process, namely, by initially heating to 600° F., cooling down to 170° F., and air blowing with ordinary air, was found to mix with up to 100 parts of the same turpentine substitute without showing the slightest tendency to precipitate. The chemical constants of the oil treated by my process, in comparison with its constants before treatment, were as follows:—

|  | Treated oil | Raw oil (refined) |
|---|---|---|
| Saponification | 220 | 190 |
| Iodin value | 115 | 180 |
| Specific gravity | 0.994 | 0.930 |
| Acid value | 4–6 | 2 |

Oil made under the present process is useful for the ordinary purposes of air blown linseed oil, but is better because of its greater flexibility in use, rendered possible by its increased miscibility with mineral oils. It is, furthermore, better adapted for admixture in varnish and lacquers containing pyroxylin, such as the compositions made for producing "artificial leather".

As stated, ordinary air blown oil is apt to give precipitates in various mixtures; and in the present oil this tendency is lessened.

What I claim is:—

1. In the manufacture of linseed oil preparations indefinitely soluble in turpentine substitutes and miscible in all proportions with mineral oils, the process which comprises quickly and briefly heating linseed oil to approximately 600° F., the said heat treatment being insufficient to produce substantial bodying and to decrease the iodin value, rapidly cooling the heated oil to a temperature of approximately 300° F. and then air blowing the so-cooled oil.

2. In the manufacture of linseed oil preparations indefinitely soluble in turpentine substitutes and miscible in all proportions with mineral oils, the process which comprises heating linseed oil in bulk to approximately 300° F., taking small proportions of the hot oil, rapidly raising said portions to between 550° and 620° F. and quickly cooling to approximately 300° F., to produce a heat treated oil, the heat treated oil having substantially the same body and iodin value as the original oil, and then air blowing the said heat treated oil at between 170° and 300° F. until the desired body is obtained, the heat treated, air blown, bodied oil having a specific gravity of approximately 0.995 and said other properties.

3. In the manufacture of linseed oil preparations indefinitely soluble in turpentine substitutes and miscible in all proportions with mineral oils, the process which comprises air blowing at temperatures between 170° and 300° F., a preliminarily heat treated linseed oil obtained by rapidly heating linseed oil to approximately 600° F. and quickly cooling the hot oil to approximately 300° F.

4. An air blown oxidized linseed oil having the characteristic properties of a linseed oil heated rapidly to a temperature approximately 600° F., cooled quickly to 300° F. and air blown at temperatures ranging from 170° to 300° F. until the said oil is substantially oxidized, the oxidation being sufficient to substantially increase the body of said oil; the said oil having a specific gravity of about 0.995, an iodin value of about 115 and being completely miscible with mineral oils.

ALEXANDER SCHWARCMAN.